United States Patent [19]
Benham et al.

[11] Patent Number: 5,866,661
[45] Date of Patent: Feb. 2, 1999

[54] ETHYLENE POLYMERIZATION PROCESSES AND PRODUCTS THEREOF

[75] Inventors: Elizabeth A. Benham; Max P. McDaniel, both of Bartlesville, Okla.; John D. Stewart, Friendswood; Lonnie J. Dodson, La Porte, both of Tex.; Charles R. Nease, Bartlesville, Okla.

[73] Assignee: Phillips Petroleum Company, Bartlesville, Okla.

[21] Appl. No.: 766,244

[22] Filed: Dec. 13, 1996

[51] Int. Cl.$^6$ .................................. C08F 2/00; C08F 4/69
[52] U.S. Cl. ................................ 526/61; 526/59; 526/64; 526/74; 526/105; 526/348.2
[58] Field of Search ................................ 526/59, 64, 74, 526/105, 61

[56] References Cited

U.S. PATENT DOCUMENTS

| | | | |
|---|---|---|---|
| 4,966,951 | 10/1990 | Benham et al. | 526/106 |
| 5,100,979 | 3/1992 | Eisinger et al. | 526/88 |
| 5,106,926 | 4/1992 | Eisinger et al. | 526/88 |
| 5,106,927 | 4/1992 | Rifi et al. | 526/133 |
| 5,115,068 | 5/1992 | Bailey et al. | 526/348.5 |
| 5,208,309 | 5/1993 | McDaniel et al. | 526/348.2 |
| 5,274,056 | 12/1993 | McDaniel et al. | 526/106 |
| 5,332,793 | 7/1994 | Cann | 526/129 |
| 5,342,907 | 8/1994 | Cann et al. | 526/129 |
| 5,367,037 | 11/1994 | Lee et al. | 526/133 |
| 5,376,743 | 12/1994 | Baker et al. | 526/88 |
| 5,405,901 | 4/1995 | Daniell et al. | 525/53 |
| 5,410,003 | 4/1995 | Xinlai Bai | 526/133 |
| 5,416,053 | 5/1995 | Bai et al. | 502/128 |
| 5,480,850 | 1/1996 | Cann et al. | 502/127 |
| 5,492,986 | 2/1996 | Xinlai Bai | 526/144 |
| 5,502,127 | 3/1996 | Xinlai Bai | 526/143 |
| 5,510,433 | 4/1996 | Baker et al. | 526/74 |

*Primary Examiner*—Mark Nagumo
*Attorney, Agent, or Firm*—Lynda S. Jolly

[57] ABSTRACT

A process to control the heat transfer coefficient in slurry olefin polymerization processes comprising shocking the polymerization reactor is provided. This shock comprises quickly decreasing and then restoring to normal operating conditions, the higher alpha-olefin comonomer to ethylene monomer weight feed ratio.

17 Claims, 3 Drawing Sheets

FIGURE 1

ETHYLENE POLYMERIZATION PROCESSES AND PRODUCTS THEREOF

BACKGROUND

This invention relates to the copolymerization of mono-1-olefin monomers, such as ethylene, with at least one higher alpha-olefin comonomer.

It is well known that mono-1-olefins, such as ethylene, can be polymerized with catalyst systems employing vanadium, chromium, or other metals on supports such as alumina, silica, aluminophosphate, titania, zirconia, magnesia and other refractory metals. Initially, such catalyst systems were used to form primarily homopolymers of ethylene. It soon developed, however, that many applications required polymers having more impact resistance than ethylene homopolymers. Consequently, polymers were developed having short chain branching, like the more flexible free radical polymerized ethylene polymers, by adding comonomers such as propylene, butene, hexene and other higher alpha-olefins which were copolymerized with ethylene to provide resins tailored to specific end uses. These polymers, and processes to make such polymers, were improved in order to more efficiently incorporate comonomers into the polymer to produce linear, low-density copolymers having high impact resistance, especially when made into films.

Unfortunately, during polymerization processes to produce these improved copolymers, the heat transfer coefficient of the polymerization reactor can be severely reduced. Loss, or decrease, of the heat transfer coefficient can result in a loss of cooling efficiency of the reactor. During the polymerization reaction, polymer product can coat, or plate out on, the reactor walls and start foul conditions in the reactor. This coating phenomenon can cause a loss of cooling efficiency, which is indicated by a decrease of the heat transfer coefficient in the reactor. A significant loss of reactor cooling efficiency creates polymer production limits on the reactor. Generally, once foul conditions begin, the condition is very difficult to reverse and fouling continues at an ever increasing rate. Eventually, the reactor can enter a condition known as "full foul", which can result when a significant build-up of polymer plates out on the reactor walls. In fact, fouling conditions can be so bad that the entire reactor can become completely plugged with solid polymer. Correction of such types of foul conditions usually requires a complete shut-down of the reactor and cleaning of the reactor walls. A reactor shut-down to correct fouling conditions can take up to several days, depending on the severity of the fouling, and can result in a significant loss of polymer production and can have a serious detrimental economic impact. Cleaning the reactor walls can restore the heat transfer coefficient to original operating conditions and can improve the cooling efficiency of the reactor.

SUMMARY OF THE INVENTION

It is an object of this invention to provide an improved polymerization process.

It is another object of this invention to provide a polymerization process which can produce copolymers of ethylene and one or more higher alpha-olefins that have high impact resistance and toughness.

It is still a further object of this invention to provide a process to "shock" a polymerization reactor, by employing "shock" polymerization conditions which require temporarily decreasing the comonomer to ethylene monomer weight feed ratio to halt and even reverse reactor foul conditions.

It is yet another object of this invention to provide a polymerization process which controls the heat transfer coefficient of the reactor.

It is still another object of this invention to provide a polymerization process to control the loss of cooling efficiency of the polymerization reactor.

It is yet another object of this invention to reduce polymerization reactor shut-down time.

In accordance with this invention, a slurry polymerization processes is provided which comprises contacting in a reaction zone under polymerization conditions, at a temperature in a range of from about 60° to 88° C., a) a paraffin, cycloparaffin, or aromatic hydrocarbon diluent;

b) ethylene monomer;

c) a higher alpha-olefin comonomer having from about 3 to about 8 carbon atoms per molecule;

d) an alkyl aluminum and/or alkyl boron compound and;

e) a catalyst system comprising chromium supported on a silica-titania support wherein the support comprises from about 2 to about 20 weight percent titanium, based on the weight of the support, and wherein the catalyst system has been activated in an oxygen-containing ambient and subsequently reduced in the presence of carbon monoxide; and wherein the higher alpha-olefin comonomer to ethylene monomer weight feed ratio is temporarily reduced and then increased.

In accordance with another embodiment of this invention, a slurry polymerization processes is provided which consists essentially of contacting in a reaction zone under polymerization conditions, at a temperature in a range of from about 60° to 88° C., a) a paraffin, cycloparaffin, or aromatic hydrocarbon diluent;

b) ethylene monomer;

c) a higher alpha-olefin comonomer selected from the group consisting of 1-butene, 1-pentene, 1-hexene, 1-octene, 4-methyl-1-pentene, and mixtures of two or more thereof;

d) an alkyl aluminum and/or alkyl boron compound and;

e) a catalyst system comprising chromium supported on a silica-titania support wherein the support comprises from about 2 to about 20 weight percent titanium, based on the weight of the support, and wherein the catalyst system has been activated in an oxygen-containing ambient and subsequently reduced in the presence of carbon monoxide; and wherein the higher alpha-olefin comonomer to ethylene monomer weight feed ratio is temporarily reduced and then increased.

BRIEF DESCRIPTION OF THE DRAWINGS

FIG. 1, on Day 2 from about 8 to 12 hours, shows that a decrease in the 1-hexene comonomer to ethylene monomer feed weight ratio increased the reactor heat transfer coefficient from about 195 btu/° F./hr/ft$^2$ to a preferred, higher value, up to nearly 220 btu/° F./hr/ft$^2$. FIG. 2 demonstrates a similar response on Day 20 from about hours 7 to 12, wherein the 1-hexene comonomer to ethylene monomer feed weight ratio was quickly decreased and the reactor heat transfer coefficient recovered from about 195 btu/° F./hr/ft² to about 210 btu/° F./hr/ft².

FIG. 3 also shows that a decrease in the 1-hexene comonomer to ethylene monomer feed weight ratio increases the reactor heat transfer coefficient to a preferred, higher value, as shown drastically on Day 17, where the reactor heat transfer coefficient increased from about 125 btu/° F./hr/ft² to about 210 btu/° F./hr/ft². A lesser change is also shown on Day 21 where the reactor heat transfer coefficient was increased from about 195 btu/° F./hr/ft² to about 210 btu/° F./hr/ft².

DESCRIPTION OF THE PREFERRED EMBODIMENTS

As used in this disclosure, the term "polymer" and "copolymer" are used interchangeably, and both terms include the product of polymerizing ethylene and a higher alpha-olefin comonomer including, but not limited to, 1-butene, 1-pentene, 1-hexene, 1-octene, and/or 4-methyl-1-pentene.

CATALYST SYSTEMS

Catalyst systems used in this invention must be supported chromium catalyst systems. The chromium catalyst systems of this invention comprise chromium supported on a silica-titania support. The catalyst support must be a silica-titania support. As used in this disclosure, the term "support" refers to a carrier for another catalytic component. However, by no means is a support necessarily an inert material; it is possible that a support can contribute to catalytic activity and selectivity. Further, as used in this application, reference to silica means a silica-containing material generally composed of 80 to 100 weight percent silica, the remainder, if any, being selected from alumina, boria, magnesia, thoria, zirconia, or mixtures thereof. For instance, the silica-containing material can consist essentially of silica and no more than 0.2 weight percent of alumina or other metal oxide. Other ingredients which do not adversely affect the catalyst system, or which are present to produce some unrelated result, can also be present. Preferably, the support contains from about 2 to about 20 weight percent titanium (Ti), based on the total weight of the dry support. Most preferably, the support contains 3 to 6 weight percent titanium, in order to produce a polymer with the most desirable physical properties. Silica-titania supports are well know in the art and can be produced as disclosed in Dietz, U.S. Pat. No. 3,887,494, the disclosure of which is hereby incorporated by reference.

The catalyst component of the catalyst system must be a chromium compound. The chromium component can be combined with the silica-titania support component in any manner known in the art, such as for example, forming a coprecipitated tergel of the silica, titanium, and chromium components. Alternatively, an aqueous solution of a water-soluble chromium component can be added to a hydrogel of the silica-titanium component. Suitable water-soluble chromium compounds include, but are not limited to, chromium nitrate, chromium acetate, and chromium trioxide. Alternatively, a solution of a hydrocarbon-soluble chromium component such as tertiary butyl chromate, a diarene chromium compound, biscyclopentadietyl chromium(II) or chromium acetylacetonate can be used to impregnate the silica-titania xerogel which results from removal of water from the cogel. The most preferred support is a cogelled silica/titania support in order to produce a polymer with the desired physical characteristics.

The chromium component is used in an amount sufficient to give from about 0.05 to about 5, preferably 0.5 to 2, weight percent chromium, based on the total weight of the chromium and support after activation.

The resulting chromium component on the silica-titania support is then subjected to activation in an oxygen-containing ambient in any manner conventionally used in the art. Because of economy and ease of use, the preferred oxygen-containing ambient is air, preferably dry air. The activation is carried out at an elevated temperature for about one-half to about 50 hours, preferably about 2 to about 10 hours at a temperature within the range of about 300° to about 1000° C., preferably about 300° to about 800° C., and most preferably within a range of 600° to 700° C. Under these activation, or calcination, procedure conditions, at least a substantial portion of any chromium in a lower valent state is converted to the hexavalent state.

The resulting calcined, supported catalyst component is cooled and then subjected to at least a partial reduction of the hexavalent chromium to a lower valent state prior to combining with a cocatalyst. The reducing agent must be carbon monoxide in order to effectively incorporate a comonomer into the copolymer. If a reducing agent other than carbon monoxide is used catalyst system activity can be decreased and/or higher amounts of comonomer can be needed in the reaction zone to achieve similar amounts of comonomer incorporation into the resultant copolymer. Generally, the calcined catalyst is directly subjected to the reducing agent, although intervening steps may be employed, if desired.

The carbon monoxide reduction process can be employed at temperatures between about 300° to about 500° C., although it is preferably employed at temperatures in a range of 350° to 450° C. for best chromium reduction. The partial pressure of the reducing gas in the reduction operation can be varied from sub-atmospheric pressures to relatively high pressure, but the simplest reducing operation is to utilize about 5 to about 25 volume percent carbon monoxide, diluted with nitrogen, at about atmospheric pressure.

The reduction time can vary from a few minutes to several hours or more. The extent of the reduction can be followed by visual inspection of catalyst color. The color of the initial activated catalyst is generally orange, indicating the presence of hexavalent chromium. The color of the reduced catalyst system employed in the invention is blue, indicating that all or substantially all of the initial hexavalent chromium has been reduced to lower oxidation states, generally the divalent state.

The course of the reduction of the air-activated orange catalyst with carbon monoxide can be determined exactly by pulse titration. A known amount of carbon monoxide is added per pulse and the amount of evolved carbon dioxide is measured. When reduction is complete only carbon monoxide will be present and the catalyst system is blue in color. The reduced blue catalyst system can be titrated with pulses of oxygen to convert the catalyst system to the original orange color. When oxidation is complete, oxygen will be evident in the off gas.

After reduction, the reduced, supported catalyst system is cooled to about room temperature, e.g, about 25° C., in an inert atmosphere such as argon or nitrogen to flush out carbon monoxide. After this flushing treatment, the catalyst system is kept away from contact with either reducing or oxidizing agents, i.e., carbon monoxide and oxygen.

Catalyst systems of this invention must be used in conjunction with a cocatalyst. Suitable cocatalysts include aluminum alkyls, boron alkyls, and mixtures thereof. These cocatalysts can decrease density and sometimes increase the melt flow characteristics of the resultant polymer. Suitable aluminum alkyls include $AIR_3$, wherein R is a hydrocarbyl radical having from about 1 to about 12, preferably from 1 to 10, carbon atoms per radical. Halide-containing cocatalysts are not as preferable because halide-containing cocatalysts can result in less efficient in-situ production of a comonomer. Triethylaluminum cocatalyst is a particularly suitable aluminum alkyl cocatalyst.

Exemplary alkylboron compounds include, but are not limited to, trialkyl boron compounds, particularly tri-n-butylborane, tripropylborane, and triethylborane (TEB). Other suitable boron compounds include trihydrocarbyl boron compounds broadly; triaryl boron compounds, such as, for example, triphenylborane; and boron alkoxides, such as, for example, $B(C_2H_5)_2(OC_2H_5)$. Halogenated alkyl boron compounds, such as, for example, $B(C_2H_5)Cl_2$, can be used as cocatalysts but are not as preferred for reasons given above.

Preferably, the cocatalyst is a trialkyl boron compound, wherein the alkyl group has from about 1 to about 10 carbon atoms and preferably from 2 to 4 carbon atoms per alkyl group. Trialkyl boron compounds are preferred cocatalysts because these compounds are effective agents to improve polymer properties, such as, for example, to reduce melt flow and to retard polymer swelling during polymerization. By far, the most preferred alkylboron cocatalyst is triethyl borane, for the reasons given above.

Most preferably, the cocatalyst is a mixture of alkylaluminum and alkylboron compounds for most efficient in-situ generation of comonomer.

The cocatalyst can be used in an amount within a range of about 0.1 to about 20 parts per million (ppm), or milligrams per kilograms (mg/kg), based on the mass of diluent in the reactor. Preferably, cocatalyst is used in an amount within a range of 0.5 to 12 mg/kg, and most preferably within a range of 0.5 to 6 mg/kg, for cost effectiveness and best resultant polymer properties.

REACTANTS

Polymers produced according to this invention must be copolymers. This inventive process is of particular applicability in producing copolymers of ethylene and higher alpha-olefins. Ethylene monomer must be polymerized with at least one higher alpha-olefin comonomer having from about 3 to about 10 carbon atoms per molecule. Preferably, the higher alpha-olefin comonomer is selected from the group consisting of 1-butene, 1-pentene, 1-hexene, 1-octene, 4-methyl-1-pentene, and mixture thereof. Ethylene monomer is the necessary monomer due to the advantageous physical properties of the resultant copolymer. Most preferably, the comonomer is 1-butene and/or 1-hexene, to achieve maximum polymer toughness.

The contents of a polymerization reactor can be determined by a variety of different methods. One method is to measure the amount of each reactant actually fed to the reactor. A second method is to sample the flash gas at a reactor outlet and then analyze the flash gas sample for reactant quantities. Due to reactor operating conditions, it is very unsafe and nearly impossible to sample the actual contents of the reactor. Usually, during a commercial polymerization process, a flash gas sample is used to determine reactor comonomer and monomer concentrations.

The total comonomer to monomer weight ratio added to the polymerization reactor, or reaction zone, during normal polymerization conditions can vary greatly. As used in this disclosure, "normal" polymerization conditions are those which are used most often for polymerization. The amount of comonomer content in the reactor feed includes comonomer which is added fresh to the reactor and comonomer which is recycled back into the reactor after recovery of the polymer. Usually the total comonomer to ethylene monomer weight ratio is within a range of about 0.03 to about 0.4; i.e., a range of about 3 parts by weight of comonomer per 100 parts by weight of ethylene to about 40 parts by weight comonomer per 100 parts by weight ethylene, also referred to as "ratio points" in this disclosure. However, during the practice of this invention, the weight ratio of comonomer to monomer fed, or added, to the reaction zone is altered for a short period of time and then returned to normal polymerization conditions. Either the amount of comonomer added to the reaction zone must be drastically reduced or the amount of ethylene monomer must be drastically increased, as discussed later in more detail.

While not wishing to be bound by theory, it is believed that additional comonomers, as disclosed earlier, can be generated in-situ in the polymerization reactor, or the reaction zone, as disclosed in U.S. Pat. No. 4,820,785 (McDaniel et al, 1988), the entirety of which is herein incorporated by reference. However, the amount of comonomer generated in-situ can be difficult to quantify. Since more than one comonomer can be generated in-situ, the resultant copolymer product can have more than one comonomer incorporated into the copolymer.

POLYMERIZATION

Polymerization of the monomer and comonomer must be carried out under slurry, also known as loop/slurry or particle form, polymerization conditions wherein the temperature is kept below the temperature at which polymer swells significantly. The slurry polymerization process is relatively simple, compared to other polymerization processes and the polymer product can be recovered much more easily. Such polymerization techniques are well-known in the art and are disclosed, for instance, in Norwood, U.S. Pat. No. 3,248,179, the disclosure of which is hereby incorporated by reference. Two sets of polymerization reactor conditions are utilized during the practice of this invention. The main difference between these two sets of conditions is the utilization of two different comonomer to ethylene monomer weight feed ratios. The first set of conditions, as stated earlier, is referred to as "normal" polymerization conditions. The second set of conditions is referred to in this disclosure as "shock" conditions. As used in this disclosure, the term "weight feed ratio" is interchangeable with "feed ratio" and both terms mean the weight ratio of comonomer to monomer fed to the reactor.

The slurry process is generally carried out in an inert diluent (medium), such as, for example, a paraffin, cycloparaffin, and/or aromatic hydrocarbon. Exemplary diluents include, but are not limited to propane, n-butane, isobutane, n-pentane, 2-methylbutane (isopentane), and mixtures thereof. Isobutane is the most preferred diluent due to low cost and ease of use.

The temperature of the polymerization reactor, or reaction zone, when using isobutane as the reactor diluent, according to this invention, is critical and must be kept below 88° C., preferably within a range of about 60° C. (140° F.) to about 88° C. (190° F.), and more preferably within a range of about 70° C. (158° F.) to about 85° C. (185° F.). Most preferably, the reaction zone temperature is within a range of 76° C.

(170° F.) to 82° C. (180° F.). Although higher reactor temperatures can be used, operating outside of the specified temperature ranges can cause the copolymer to swell and the reactor to foul irreversibly.

Pressures in the slurry process can vary from about 110 to about 700 psia (0.76–4.8 MPa) or higher. The catalyst system is kept in suspension and is contacted with the monomer and comonomer(s) at sufficient pressure to maintain the medium and at least a portion of the monomer and comonomer(s) in the liquid phase. The medium and temperature are thus selected such that the copolymer is produced as solid particles and is recovered in that form. Catalyst system concentrations in the reactor can be such that the catalyst system content ranges from 0.001 to about 1 weight percent based on the weight of the reactor contents.

Two preferred polymerization methods for the slurry process are those employing a loop reactor of the type disclosed in Norwood and those utilizing a plurality of stirred reactors either in series, parallel or combinations thereof wherein the reaction conditions can be the same or different in the different reactors. For instance, in a series of reactors, a chromium catalyst system which has not been subjected to the reduction step can be utilized either before or after the reactor utilizing the catalyst system of this invention. In another specific instance, a conventional chromium oxide catalyst system can be utilized in a reactor in parallel with a reactor utilizing the catalyst system of this invention and the resulting polymerization diluents can be combined prior to recovering copolymer.

The molecular weight of the copolymer can be controlled by various means known in the art such as adjusting the temperature of the reaction zone (higher temperature giving lower molecular weight), introducing hydrogen to lower the molecular weight or varying the catalyst system compounds.

The catalyst system, cocatalyst, monomer, and comonomer can be added to the reaction zone in any order, according to any method known in the art. For example, the catalyst system, cocatalyst, monomer, and comonomer can be added simultaneously to the reaction zone. If desired, the catalyst system and cocatalyst can be precontacted in an inert ambient prior to contacting the monomer and/or comonomer. If the catalyst and cocatalyst are precontacted, as disclosed by McDaniel et al in U.S. Pat. No. 4,735,931, herein incorporated by reference, some comonomer can be generated in-situ; therefore, the amount of comonomer that is affirmatively added to the reaction zone can be reduced, but still remain within the ranges disclosed above.

During normal polymerization conditions, when making a polymer within a density range of about 0.918 to about 0.925 g/cc, the comonomer to ethylene monomer weight ratio, as stated earlier, generally is within a range of about 0.03 to about 0.4 and generally within a range of about 0.03 to about 0.15. However, this feed weight ratio can vary depending on the type of polymer desired. Expressed in different terms, the comonomer to ethylene monomer feed ratio points generally are within a range of about 2 to about 40 and generally within a range of about 2 to about 15.

The comonomer to ethylene monomer weight ratio during shock reactor conditions can be decreased by an amount up to about 1 to about 10 ratio points lower than the normal, or initial, reactor operating conditions. For example, if the normal reactor comonomer to ethylene monomer feed weight ratio is 13, then the shock feed ratio conditions can be within a range of about 11 to about 3. Preferably, the comonomer to ethylene monomer feed weight ratio is decreased by about 2 to about 7 ratio points and most preferably decreased by 3 to 5 ratio points, in order to reverse the loss of heat transfer. Too much of a decrease in the comonomer to ethylene feed weight ratio can result in a change in the resultant polymer density and other physical properties. Too little change can result in ineffective reversal of loss of cooling efficiency. Quite unexpectedly, the change in the feed weight ratio results in almost no change in the reactor flash gas composition.

Shock reactor conditions also can be defined as a lowering of the comonomer to ethylene monomer weight feed ratio by about 15 to about 75 percent, preferably lowering the weight feed ratio by about 15 to about 60 percent. Most preferably, the comonomer to ethylene monomer weight feed ratio is lowered by 15 to 40 percent in order to have the minimal or no change in the flash gas composition and minimal or no change in the copolymer properties and characteristics.

Generally, duration of shock reactor conditions can last for a few minutes up to about 15 hours, preferably for about 1 hour to about 6 hours, and most preferably last for 90 minutes to about 3 hours. Again, too long of a shock time can result in a polymer with different, out-of-specification properties, as indicated by a change in the flash gas reactant concentrations. Too short of a shock time can have no effect on the loss of cooling capacity and the heat transfer coefficient will not be restored that of normal operating conditions.

PRODUCT

The polymers produced in accordance with this invention must be a copolymer of ethylene and at least one higher alpha-olefin. The comonomer, or higher alpha-olefin, whether affirmatively added or generated in-situ in the polymerization reactor, is very efficiently incorporated into the copolymer. The copolymer product contains from about 7 to about 15 weight percent, preferably from about 8 to about 12 weight percent comonomer, based on the total weight of the copolymer product. Most preferably, the comonomer is present in the copolymer with the range of 8 to 10 weight percent for the best copolymer properties and reactor run conditions.

The copolymers produced according to this invention generally are impact resistant, tough, linear, low-density polyethylene copolymers, having a broad molecular weight distribution. Usually, the melt index (MI) for polymers produced in accordance with this invention, before pelleting, are within a range of about 0.05 to about 0.35 g/10 min., preferably within a range of about 0.05 to about 0.3 g/10 min. Most preferably, the inventive polymers have a MI within a range of 0.2 to 0.3, for best processability and best melt strength, i.e., toughness. Usually, the high load melt index (HLMI) for polymers produced in accordance with this invention are within a range of about 15 to about 40 g/10 min., and preferably within a range of about 20 to about 30 g/10 min. Most preferably, the polymers have a HLMI within a range of 23 to 29, for best processability and melt strength, i.e., toughness. Generally, as HLMI decreases, processing difficulty increases; however, as HLMI decreases, polymer melt strength also increases. Therefore, polymers of this invention usually have a HLMI/MI ratio, before pelleting, within a range of about 60 to about 150, preferably within a range of about 70 to about 120. Most preferably, the HLMI/MI ratio is within a range of 80 to 100, for the reasons given above.

The polymers produced in accordance with this invention also usually have a broad molecular weight distribution, as indicated by the heterogeneity index (HI), i.e., the ratio of weight average molecular weight (Mw) to number average molecular weight (Mn). Mw/Mn is within a range of about 12 to about 35, and preferably within a range of about 15 to about 30. Most preferably, the Mw/Mn ratio is within a range of 18 to 25, for best polymer processability. Generally, for a given MI, as Mw/Mn is broadened, the processability of the polymer improves.

The density of the copolymer products produced in accordance with this invention are less than or equal to 0.925 g/cc preferably from about 0.915 to about 0.925 g/cc. Most preferably, the copolymer density is within the range of 0.918 to 0.922 g/cc. Usually, shock reactor conditions are most beneficial when the polymer being produced has a density of less than about 0.925 g/cc. Shock conditions have not been found to be an effective remedy for loss of the heat transfer coefficient during production of higher density polymers.

Other aspects and embodiments of this invention can be shown by the following examples.

EXAMPLES

Example I

Two examples are provided from a production run of a low density polymer lasting over 25 days. During the run, the heat transfer coefficient had gradually deteriorated, presumably due to polymer buildup on the reactor walls. A minor and very brief change, or "shock", was made in the 1-hexene to ethylene weight feed ratio and the heat transfer coefficient immediately recovered, even though the change was too brief to affect reactant concentrations or polymer density to any significant degree.

The discovery of these "shock" conditions is valuable because, as stated earlier, a decrease in heat transfer coefficient is an indication that heat transfer between the reactor and coolant has become less efficient. A decrease in the heat transfer coefficient is usually attributed to a skin or plate-out formation of polymer on the walls of the reactor. As the heat transfer decreases, the coolant demand increases, and over time the coolant supply will not be able to control the reactor temperature. A severe case will result in the reactor having to be shut down and the reactor walls having to be manually and mechanically cleaned in order to recover the heat transfer capability.

During a high density foul, loss of heat transfer is usually irreversible. That is, the reactor must be shut down and physically cleaned to remove the wall scum. However, it was discovered unexpectedly that while making low density polymers by the process herein described as normal polymerization reactor conditions, where the polymer has a density within a range of about 0.915 to about 0.925g/cc, as previously discussed, at a reactor temperature within a range of about 170° to 180° F., the heat transfer coefficient frequently decreases slowly for a period of hours, days or even weeks. Under the above-described circumstances, the loss of heat transfer coefficient actually can be recovered by an exercise of the inventive shock condition steps described herein.

The slurry reactor size in both of the following Examples was about 27,000 gallons. The catalyst system employed was chromium supported on a silica/titania support containing 4.5 weight percent titanium, based on the total weight of the support and 0.8 weight percent chromium, based on the weight of the total, supported catalyst. The supported catalyst system was activated at about 700° C. (1300° F.) and then reduced in 10% carbon monoxide at about 370° C. (700° F.). During polymerization, the reactor temperature was kept within a range of about 76°–78° C. (170°–172° F.). The resultant ethylene copolymer generally had a density within a range of about 0.918 to about 0.922 g/cc, determined for a fluff sample in accordance with ASTM D1505-68 and ASTM D1928, Condition C, on a compression molded sample, cooled at about 15° C. per minute, and conditioned at room temperature for about 40 hours, and the HLMI was within a range of about 20 to about 30 g/10 min, determined in accordance with ASTM D1238 at 190° C. with a 2,160 gram weight.

Days 1–3

Figure 1:
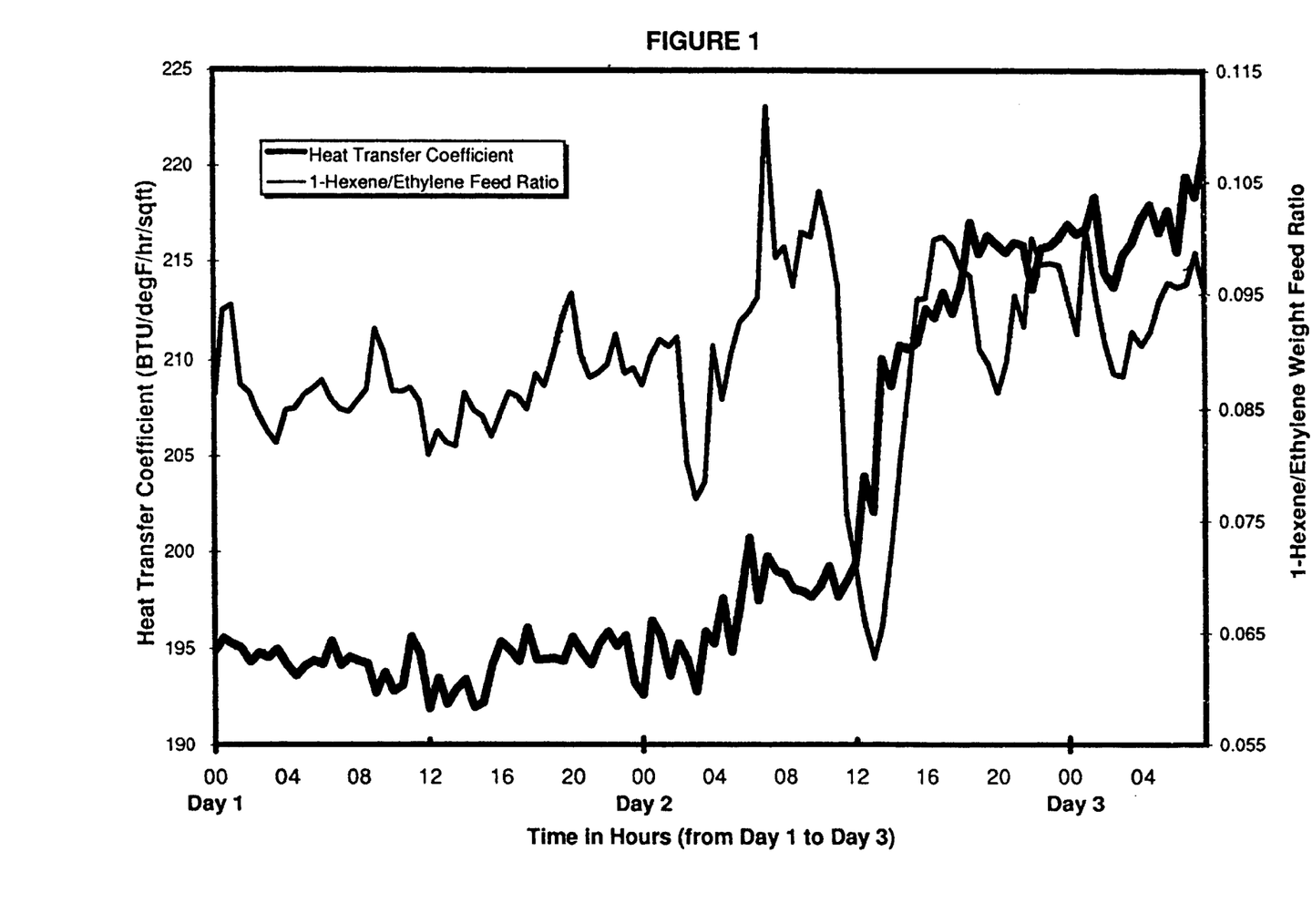
FIGS. 1 and 2 show the correlation of heat transfer coefficient to time and 1-hexene comonomer to ethylene monomer weight feed ratio to time during an olefin polymerization run.

The heat transfer coefficient of the polymerization reactor during this Example is shown in FIG. 1. The ethylene concentration was set at about 2.8–3.3 weight percent. On Day 1 of the run, the polymer density was in specification, between 0.918 and 0.922 g/cc. Notice that at constant reactor temperature conditions of between 76°–78° C., the heat transfer coefficient had stabilized between 193 and 200 btu/° F./hr/ft$^2$. The ethylene concentration in the reactor, as measured in the flash gas was 3 weight percent, hydrogen concentration in the flash gas was 2 mole percent, hexene flash gas concentration was 2.7 weight percent, and reactor solids was about 30–31 weight percent. The comonomer, i.e., 1-hexene, feed rate into the reactor was between about 2200 pounds 1-hexene for each 30,000 pounds ethylene (0.073 weight ratio) to about 3300 pounds 1-hexene for each 35,500 pounds ethylene (0.093 weight ratio) on Day 2.

During the day on Day 2, the polymerization reactor was operated in "shock" conditions and the 1-hexene feed rate suddenly was decreased to about 0.058 weight ratio of the ethylene (1500 pounds 1-hexene to 26,000 pounds ethylene) for about one to two hours. Coincidently, ethylene concentration increased slightly to about 3.7 weight percent during this event, but the diminished 1-hexene feed was too brief to have any significant effect on the 1-hexene concentration in the flash gas, which remained almost unchanged. Nevertheless, this brief action caused the heat transfer coefficient to rapidly recover up to 220 btu/° F./hr/ft$^2$ even though no significant change in polymer density was noticed; the polymer density remained within the range of about 0.918 to about 0.922 g/cc.

Thus the 1-hexene/ethylene weight feed ratio was dropped about 3.5 ratio points, or about by 38 percent of the initial weight ratio, for a period of one to two hours and then the 1-hexene/ethylene weight feed ratio returned to normal. This period was too brief to significantly affect the reactant concentrations in the reactor and the polymer did not even drift out of specification on density. Nevertheless, this small "shock" action caused a complete reversal of the heat transfer coefficient loss.

Days 19 and 20

Figure 2:
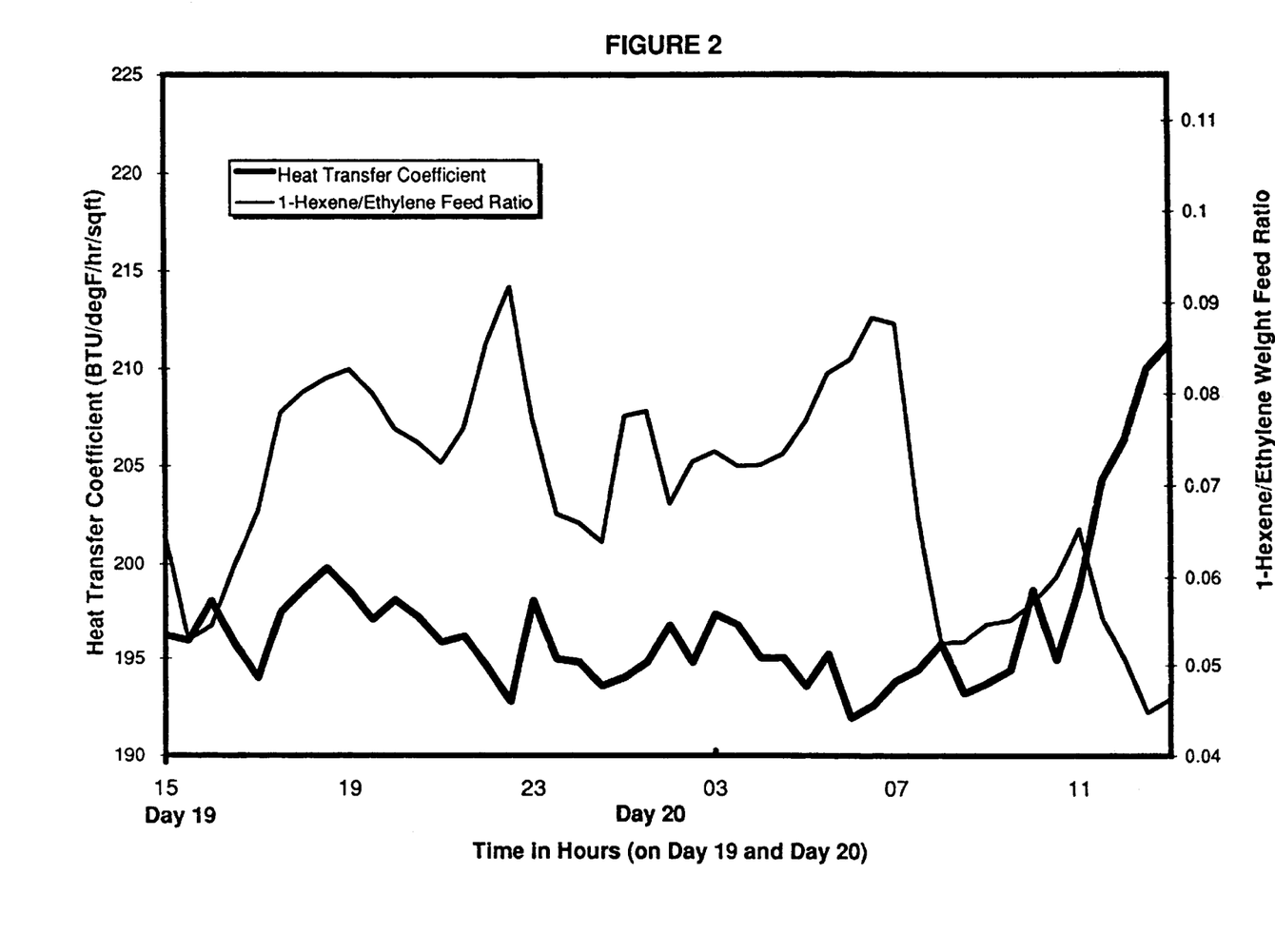

Another example is evident in the same run as in Example 1, shown in FIG. 2. On Day 19, the heat transfer coefficient was 195 to 200 btu/° F./hr/ft$^2$. 1-Hexene feed at this time was about 1600 pounds/hr and ethylene feed was about 24,000 pounds/hr. Thus, the 1-hexene comonomer to ethylene monomer weight feed ratio was about 0.067. On Day 20, the 1-hexene feed rate to the reactor was reduced to about 550 pounds/hr with ethylene fed at about 20,000 pounds/hr (the feed weight ratio was about 0.028). This is a temporary drop of 3.9 ratio points, or about 38 percent, of the 1-hexene comonomer/ethylene monomer weight feed ratio. Note, again, that the heat transfer coefficient immediately rose again back to 220 btu/° F./hr/ft² even though no significant change in the polymer density was noticed, i.e., the polymer density remained within a range of about 0.918 to about 0.922 g/cc.

Example II

Figure 3:
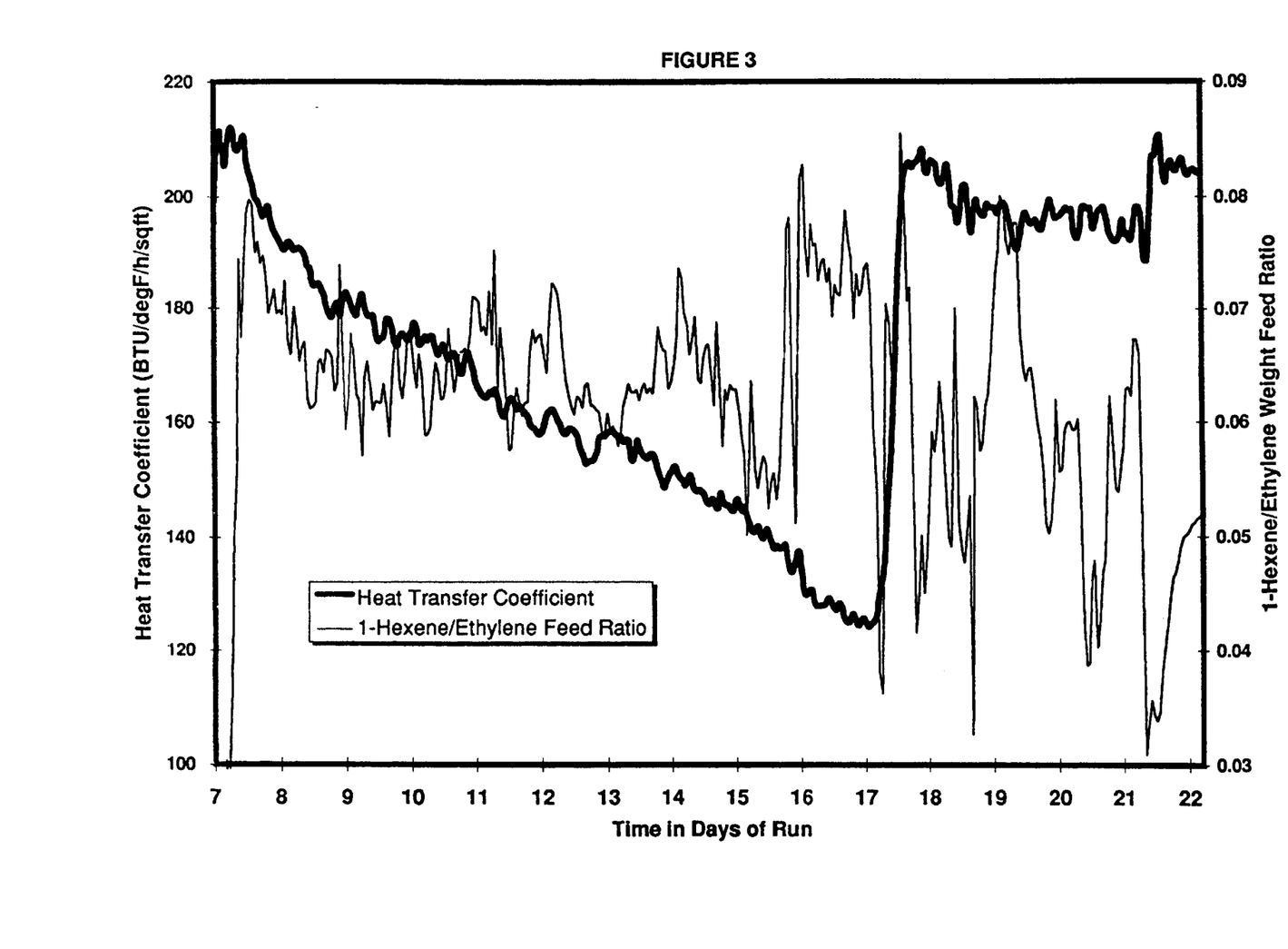
FIG. 3, again, shows the correlation of reactor heat transfer coefficient to time and 1-hexene comonomer to ethylene monomer weight feed ratio to time during a second olefin polymerization run.

Another example is provided from another production run of a low density polymer lasting over 22 days. During the run, the heat transfer coefficient, again, had gradually deteriorated, presumably due to polymer buildup on the reactor walls. Generally, under optimum conditions and as indicated by FIG. 3, the heat transfer coefficient should be around about 200 to about 210 btu/° F./hr/ft². A severe, but brief change, or "shock", was made in the 1-hexene to ethylene weight feed ratio and the heat transfer coefficient immediately recovered, even though the change was too brief to affect reactant concentrations. Unfortunately, even though the heat transfer coefficient recovered to an optimal value, the shock was too severe and the density jumped momentarily to 0.929 g/cc.

As with the first Example, the slurry reactor was about 27,000 gallons. The same catalyst system was employed in Example II as in Example I. During polymerization, the reactor temperature was kept within a range of about 79°–80° C. (175°–176° F.). The resultant ethylene copolymer generally had a density, except as discussed above, within a range of about 0.918 to about 0.922 g/cc, determined for a fluff sample in accordance with ASTM D1505-68 and ASTM D1928, Condition C, on a compression molded sample, cooled at about 15° C. per minute, and conditioned at room temperature for about 40 hours, and the HLMI was within a range of about 20 to about 30 g/10 min, determined in accordance with ASTM D1238 at 190° C. with a 2,160 gram weight.

The heat transfer coefficient of the polymerization reactor during this Example is shown in FIG. 3. The ethylene concentration was set at about 3.0–3.2 weight percent. The polymer density was in the preferred specification range, between 0.918 and 0.922 g/cc, during the entire run except for about several hours on Day 17. Notice that at constant reactor temperature conditions of between 76–78° F., the heat transfer coefficient had stabilized around, or above 200 btu/° F./hr/ft². The ethylene concentration in the reactor, as measured in the flash gas was 3.2 weight percent, hydrogen concentration in the flash gas was 1.1 mole percent, hexene flash gas concentration was 2.2 weight percent, and reactor solids was about 30–31 weight percent. The comonomer, i.e., 1-hexene, feed rate into the reactor was between about 1500 pounds 1-hexene for each 21,000 pounds ethylene (0.07 weight ratio) to about 1700 pounds 1-hexene for each 21,000 pounds ethylene (0.08 weight ratio).

As indicated by FIG. 3, the heat transfer coefficient steadily declined from Day 7 to Day 17, to a critically low point of about 125 btu/° F./hr/ft². On Day 17, the polymerization reactor was operated in "shock" conditions and the 1-hexene feed rate suddenly was decreased to about 0.036 weight ratio of the ethylene (756 pounds 1-hexene to 21,000 pounds ethylene) for about one to two hours. This brief action caused the heat transfer coefficient to rapidly recover up to 210 btu/° F./hr/ft². The correction was too severe, as indicated by the above discussed minor change in polymer density. The polymer density rose above 0.925 g/cc for about eight hours, after shock conditions, and only for a few minutes to about 0.930 g/cc. However, the polymer density quickly recovered to the specification range of about 0.918 to about 0.922 g/cc after "shock" conditions.

Thus, the 1-hexene/ethylene weight feed ratio was dropped about 3.4 to 4.4 ratio points, or about by 45 to 51 percent of the initial weight ratio, for a period of one to two hours and then the 1-hexene/ethylene weight feed ratio returned to normal. Nevertheless, this small "shock" action caused a complete reversal of the heat transfer coefficient loss.

Another example of the invention can be seen on Day 21 of the run. The heat transfer coefficient dropped to about 195 btu/° F./hr/ft². A quick decrease of the 1-hexene comonomer to ethylene monomer ratio corrected the reactor heat transfer coefficient to about 210 btu/° F./hr/ft².

While this invention has been described in detail for the purpose of illustration, it is not to be construed as limited thereby but is intended to cover all changes and modifications within the spirit and scope thereof.

That which is claimed:

1. A slurry polymerization process comprising contacting in a reaction zone under polymerization reaction conditions, at a temperature of less than or equal to 88° C.:
    a) a diluent selected from the group consisting of paraffins, cycloparaffins, aromatic hydrocarbons, a mixtures thereof;
    b) ethylene monomer;
    c) at least one higher alpha-olefin comonomer having from about 3 to about 8 carbon atoms per molecule;
    d) a cocatalyst selected from the group consisting of alkyl boron compounds and alkyl aluminum; and
    e) a catalyst system comprising chromium supported on a silica-titania support, wherein said support comprises from about 2 to about 20 weight percent titanium, based on the weight of the support, and wherein said catalyst system has been activated in an oxygen-containing ambient and subsequently reduced in the presence of carbon monoxide in an inert ambient; and
    wherein the higher alpha-olefin comonomer to ethylene monomer weight feed ratio is temporarily reduced by about 15 to about 60 percent for a time within a range of about a few minutes to about 15 hours.

2. A process according to claim 1 wherein said temperature in the reaction zone is within a range of from about 60° C. to about 88° C.

3. A process according to claim 1 wherein said cocatalyst is a trialkyl boron compound.

4. A process according to claim 3 wherein said trialkyl boron compound is triethylborane and is present in the reaction zone in a range of from about 1 to about 20 ppm, based on the mass of the diluent.

5. A process according to claim 1 wherein said higher alpha-olefin comonomer is selected from the group consisting of 1-butene, 1-pentene, 1hexene, 1-octene, 4-methyl-1-pentene, and mixtures of two or more thereof.

6. A process according to claim 5 wherein said comonomer is 1-hexene.

7. A process according to claim 5 wherein said comonomer is 1-butene.

8. A process according to claim 1 wherein said catalyst system activation is carried out in air at a temperature in a range of from about 300° to about 1,000° C. and wherein said carbon monoxide reduction is carried out at a temperature in a range of from about 300° to 500° C.

9. A process according to claim 1 wherein said silica-titania support is formed by coprecipitation.

10. A process according to claim 1 wherein the comonomer to ethylene monomer weight feed ratio is decreased by adding ethylene into the reactor.

11. A process according to claim 1 wherein the comonomer to ethylene monomer weight feed ratio is decreased by reducing the amount of comonomer introduced into the reactor.

12. A process according to claim 1 wherein the comonomer to ethylene monomer weight feed ratio is decreased by about 1 to 10 ratio points over normal operating conditions.

13. A process to control the heat transfer coefficient in a slurry polymerization process comprising contacting in a reaction zone under polymerization conditions, at a temperature in the range of from about 60° to about 88° C.:
   a) a diluent selected from the group consisting of paraffins, cycloparaffins, aromatic hydrocarbons, a mixtures thereof;
   b) ethylene monomer;
   c) at least one comonomer selected from the group consisting of 1-butene, 1-pentene, 1-hexene, 1-octene, 4-methyl-1-pentene, and mixtures thereof, wherein the comonomer to ethylene monomer feed weight ratio is from about 0.03 to about 0.4;
   d) a cocatalyst selected from the group consisting of alkyl boron compounds and alkyl aluminum; and
   e) a catalyst system comprising chromium supported on a silica-titania support, wherein said support comprises from about 2 to about 20 weight percent titanium, based on the weight of the support, and wherein said catalyst system has been activated in an oxygen-containing ambient and subsequently reduced in the presence of carbon monoxide in an inert ambient;
   f) temporarily decreasing the weight feed ratio of comonomer to ethylene monomer by about 15 to about 60 percent for a time within a range of about a few minutes to about 15 hours.

14. A process according to claim 13 wherein the comonomer to ethylene monomer weight feed ratio is decreased by adding ethylene into the reactor.

15. A process according to claim 13 wherein the comonomer to ethylene monomer weight feed ratio is decreased by reducing the amount of comonomer introduced into the reactor.

16. A process according to claim 13 wherein the comonomer to ethylene monomer weight feed ratio is decreased by about 1 to 10 ratio points over normal operating conditions.

17. A process to control the heat transfer coefficient in a slurry polymerization process comprising contacting in a reaction zone under polymerization conditions, at a temperature in the range of from about 76° to about 82° C.:
   a) a diluent selected from the group consisting of paraffins, cycloparaffins, aromatic hydrocarbons, a mixtures thereof;
   b) ethylene monomer;
   c) at least one higher alpha-olefin comonomer selected from the group consisting of 1-butene, 1-hexene, and mixtures thereof, wherein the comonomer to ethylene monomer weight feed ratio is from about 0.03 to about 0.4;
   d) a cocatalyst selected from the group consisting of alkyl boron compounds and alkyl aluminum; and
   e) a catalyst system comprising chromium supported on a silica-titania support, wherein said support comprises from about 2 to about 20 weight percent titanium, based on the weight of the support, and wherein said catalyst system has been activated in an oxygen-containing ambient and subsequently reduced in the presence of carbon monoxide in an inert ambient;
   f) wherein the higher alpha-olefin comonomer to ethylene monomer weight ratio is temporarily reduced by about 1 to about 10 ratio points over normal operating conditions for a time within a range of about a few minutes to about 15 hours.

* * * * *